Ma

United States Patent
Kim et al.

(10) Patent No.: US 11,106,325 B2
(45) Date of Patent: Aug. 31, 2021

(54) ELECTRONIC APPARATUS AND CONTROL METHOD THEREOF

(71) Applicant: SAMSUNG ELECTRONICS CO., LTD., Suwon-si (KR)

(72) Inventors: Hoyeon Kim, Suwon-si (KR); Sangyoung Lee, Suwon-si (KR); Kyuhyun Cho, Suwon-si (KR); Heeseok Jeong, Suwon-s (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 16/256,172

(22) Filed: Jan. 24, 2019

(65) Prior Publication Data
US 2019/0238785 A1    Aug. 1, 2019

(30) Foreign Application Priority Data
Jan. 31, 2018    (KR) .................. 10-2018-0011713

(51) Int. Cl.
*G06F 3/0481* (2013.01)
*G06F 3/01* (2006.01)
*G08C 17/02* (2006.01)
*H04N 21/422* (2011.01)
*H04M 1/72412* (2021.01)
*H04M 1/72415* (2021.01)
*H04N 21/41* (2011.01)

(52) U.S. Cl.
CPC ............ *G06F 3/0481* (2013.01); *G06F 3/017* (2013.01); *G08C 17/02* (2013.01); *H04M 1/72412* (2021.01); *H04M 1/72415* (2021.01); *H04N 21/4222* (2013.01); *H04N 21/42204* (2013.01); *G08C 2201/93* (2013.01); *H04M 2250/12* (2013.01); *H04N 21/41265* (2020.08); *H04N 21/42209* (2013.01); *H04N 21/42221* (2013.01); *H04N 21/42222* (2013.01)

(58) Field of Classification Search
None
See application file for complete search history.

(56) References Cited

U.S. PATENT DOCUMENTS

| 9,484,001 | B2 | 11/2016 | Dabhi | |
|---|---|---|---|---|
| 9,965,999 | B1* | 5/2018 | Barnes | ..................... G09G 3/32 |
| 2010/0105442 | A1 | 4/2010 | Yoo | |
| 2010/0216519 | A1* | 8/2010 | Kitaya | ............. H04M 1/72566 455/567 |

(Continued)

FOREIGN PATENT DOCUMENTS

| CN | 101729670 A | 6/2010 |
|---|---|---|
| CN | 103455134 A | 12/2013 |

(Continued)

OTHER PUBLICATIONS

International Search Report (PCT/ISA/210) and Written Opinion (PCT/ISA/237) dated May 31, 2019 issued by the International Searching Authority in International Application No. PCT/KR2019/001189.

(Continued)

*Primary Examiner* — Tuan S Nguyen
(74) *Attorney, Agent, or Firm* — Sughrue Mion, PLLC

(57) ABSTRACT

An electronic apparatus recognizing the direction of the user motion for controlling a function of an external apparatus.

17 Claims, 13 Drawing Sheets

(56) References Cited

U.S. PATENT DOCUMENTS

| | | | |
|---|---|---|---|
| 2010/0295773 A1 | 11/2010 | Alameh et al. | |
| 2011/0070878 A1 | 3/2011 | Kim | |
| 2011/0134030 A1 | 6/2011 | Cho | |
| 2012/0173767 A1 | 6/2012 | Kim et al. | |
| 2013/0002576 A1 | 1/2013 | Kim et al. | |
| 2014/0380249 A1* | 12/2014 | Fleizach | G06F 3/017 715/863 |
| 2015/0061842 A1* | 3/2015 | Yoon | G06F 3/015 340/12.5 |
| 2015/0205521 A1 | 7/2015 | Ding et al. | |
| 2015/0326909 A1 | 11/2015 | Eun et al. | |
| 2015/0348493 A1 | 12/2015 | Chae et al. | |
| 2016/0004317 A1 | 1/2016 | Su | |
| 2016/0360344 A1* | 12/2016 | Shim | G06F 3/04842 |
| 2017/0344328 A1 | 11/2017 | Kim et al. | |
| 2018/0018450 A1 | 1/2018 | DeBates et al. | |

FOREIGN PATENT DOCUMENTS

| | | |
|---|---|---|
| CN | 103713735 A | 4/2014 |
| CN | 104111730 A | 10/2014 |
| CN | 204965278 U | 1/2016 |
| CN | 106462325 A | 2/2017 |
| JP | 2012-253716 A | 12/2012 |
| KR | 10-2012-0079208 A | 7/2012 |
| KR | 10-2013-0120706 A | 11/2013 |
| KR | 10-1325026 B1 | 11/2013 |
| KR | 10-2015-0046304 A | 4/2015 |
| KR | 10-1602461 B1 | 3/2016 |
| KR | 10-1670352 B1 | 10/2016 |
| KR | 10-2017-0087438 A | 7/2017 |
| WO | 2016113740 A1 | 7/2016 |

OTHER PUBLICATIONS

Communication dated Nov. 6, 2020 issued by the European Patent Office in European Application No. 19747471.1.

Communication dated Jan. 4, 2021 issued by the State Intellectual Property Office of P.R. China in Chinese Application No. 201980009277.1 English Translation.

* cited by examiner

FIG. 6
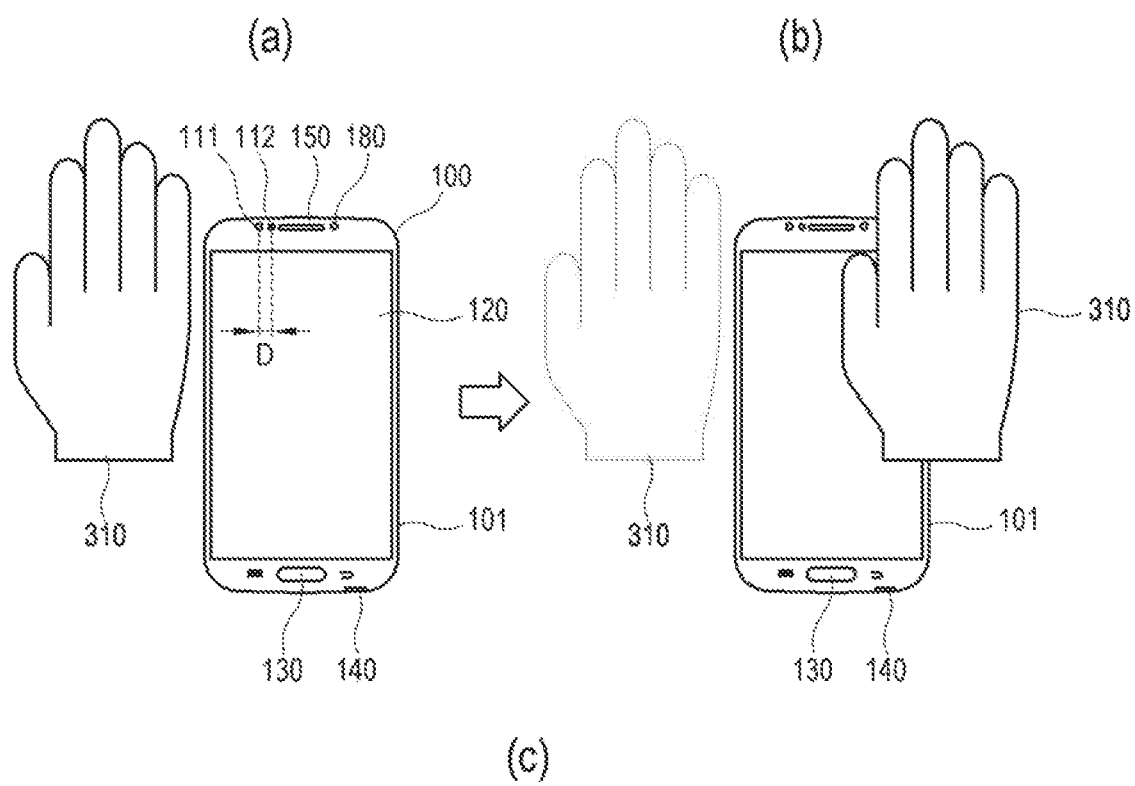
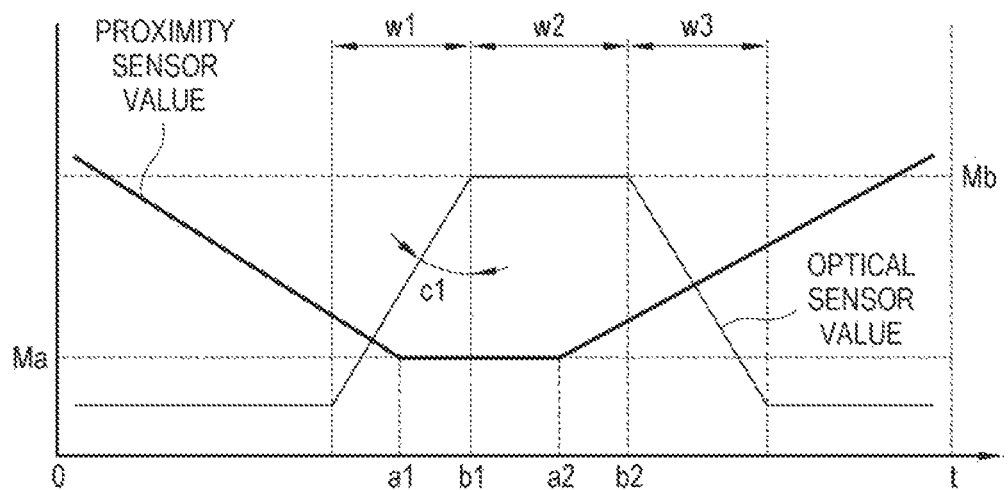

FIG. 7
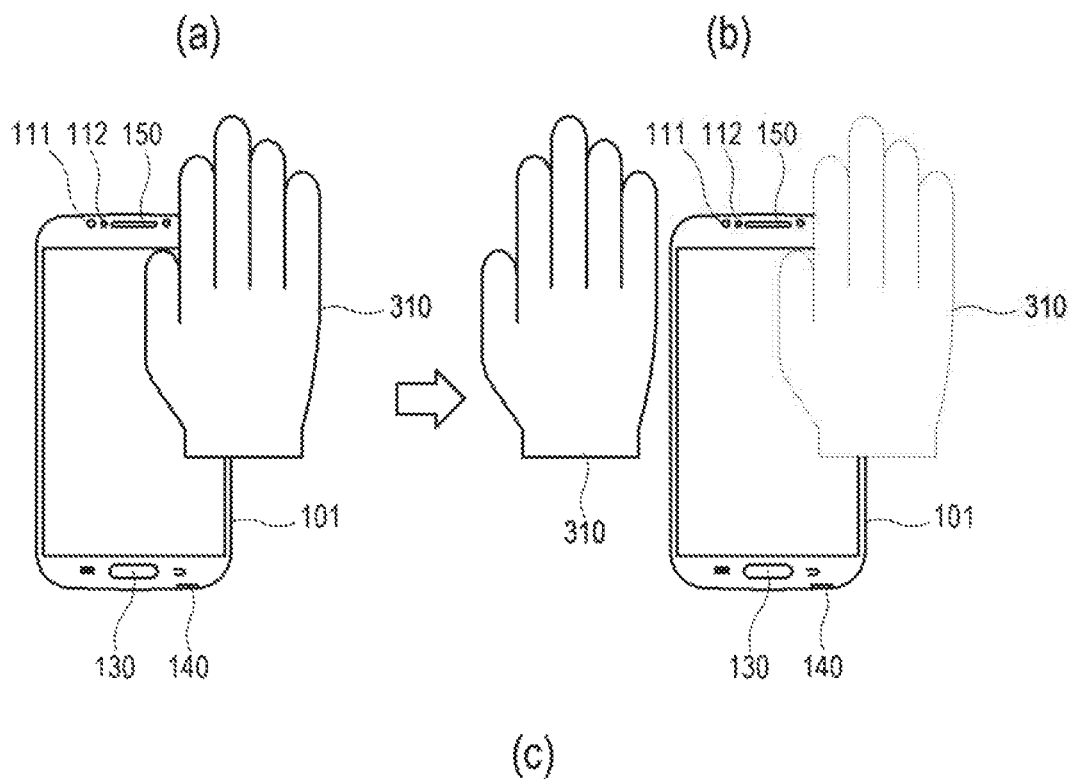
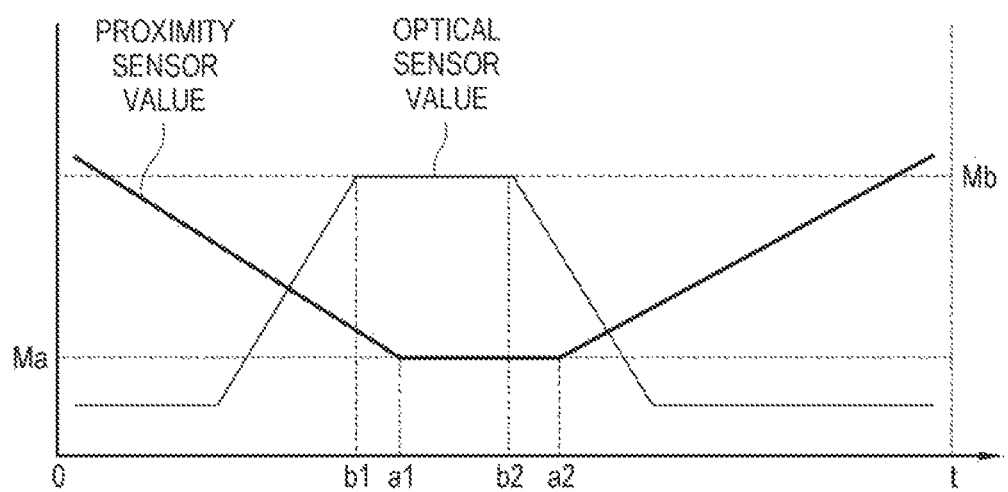

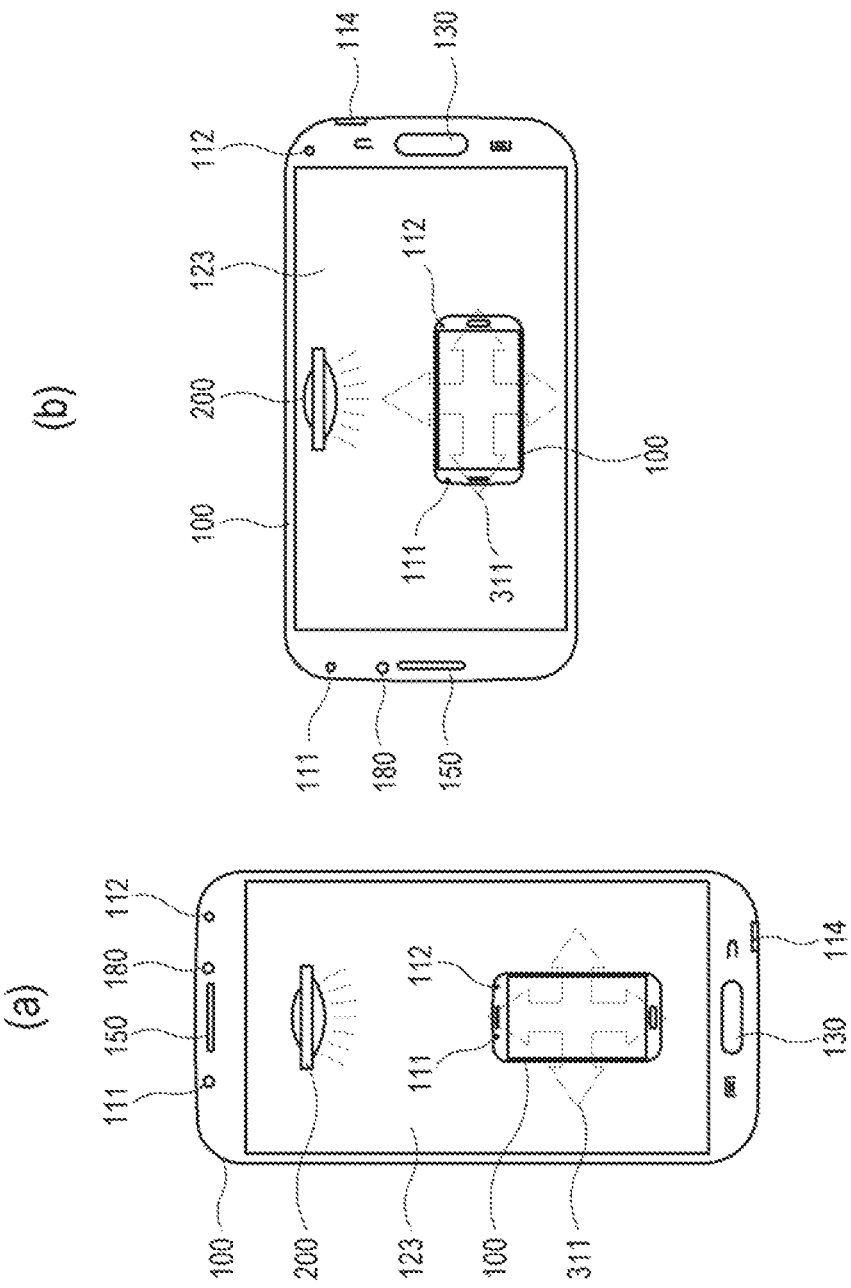

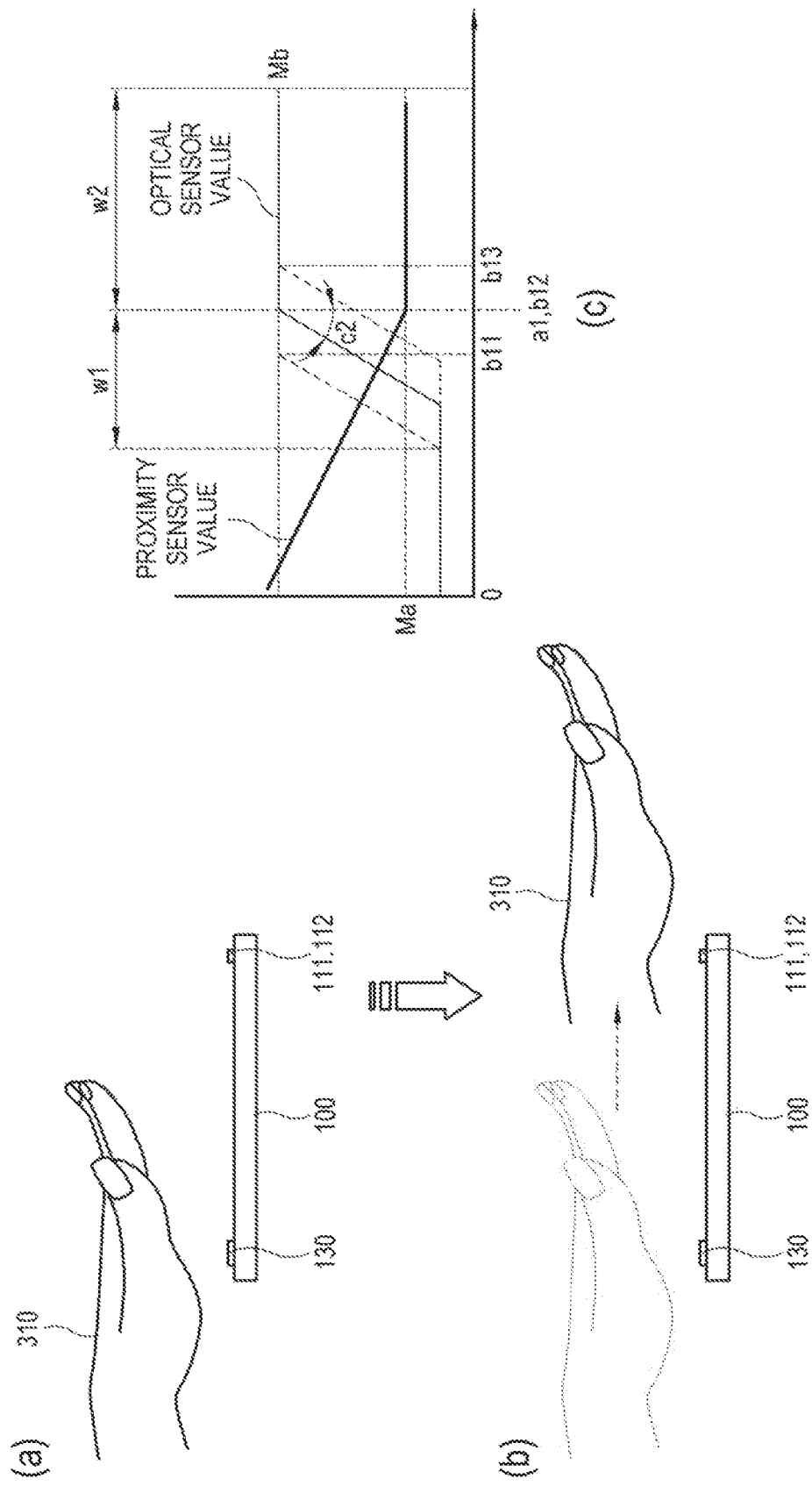

FIG. 13
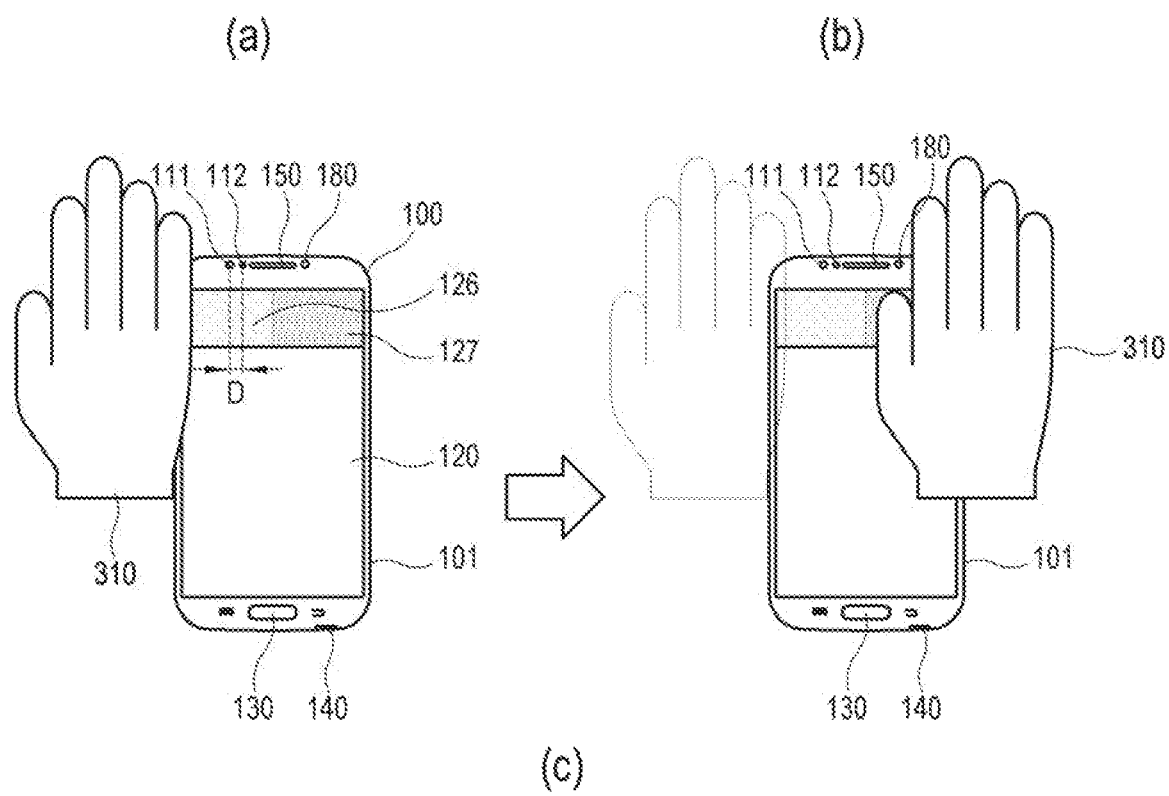
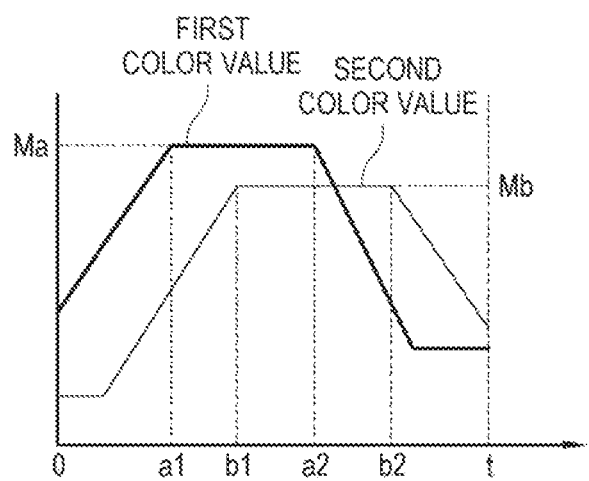

FIG. 14
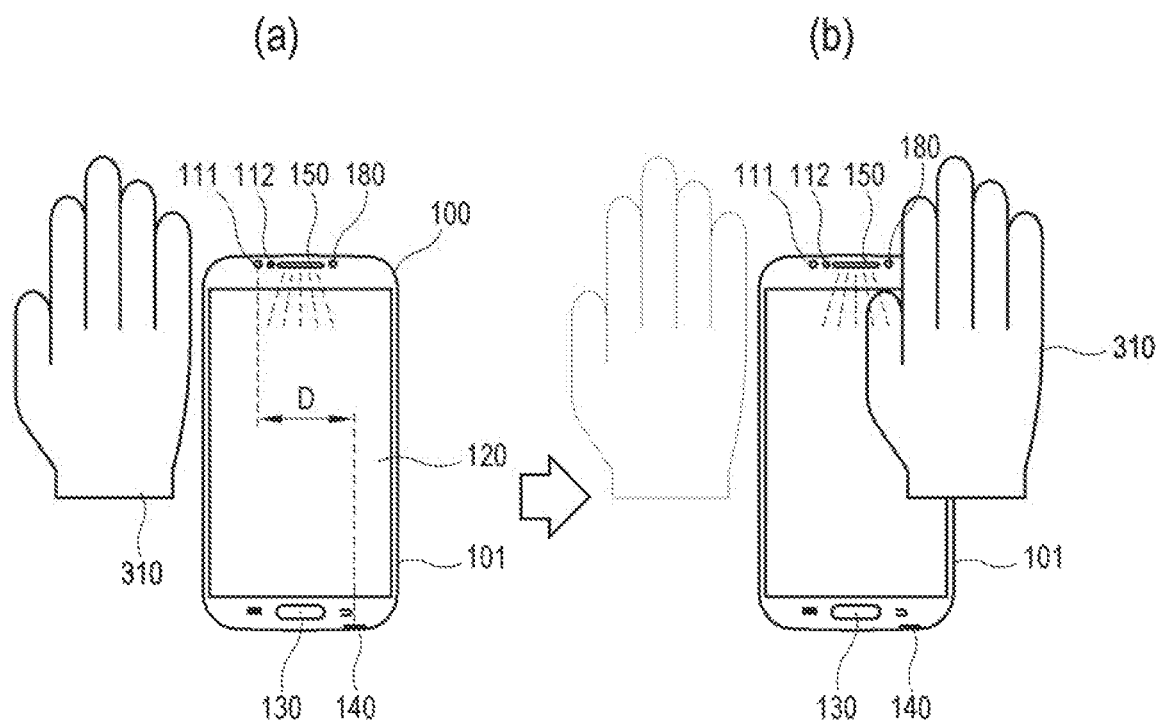
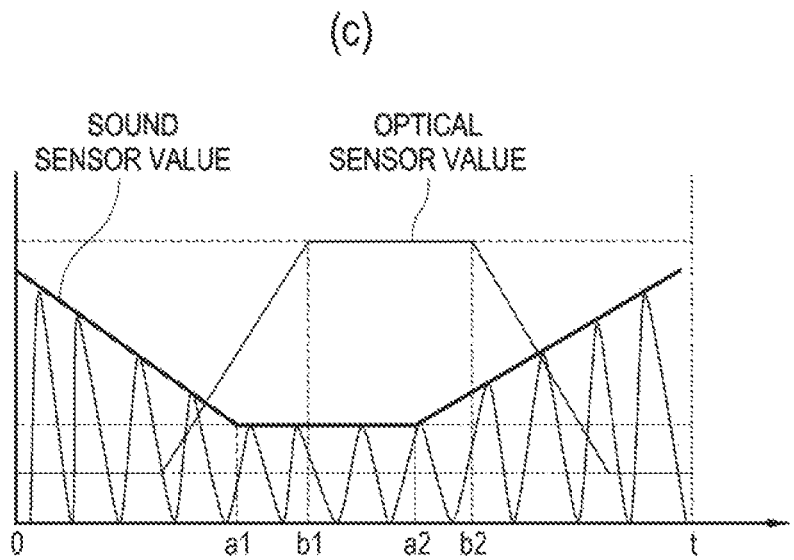

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0011713 filed on Jan. 31, 2018, in the Korean Intellectual Property Office, the disclosure of which is herein incorporated by reference in its entirety.

BACKGROUND

1. Field

Apparatuses and methods consistent with the embodiments relate to an electronic apparatus and a control method thereof, and more particularly to an electronic apparatus which controls an external apparatus in response to a received user input and a control method thereof.

2. Description of the Related Art

With proliferation of functions, a smart phone and other similar electronic apparatus have become necessities for modern people. As one function of a smart phone, there is a function of using the smart phone to control another electronic apparatus (hereinafter, referred to as an 'external apparatus'), such as a television. In controlling the external apparatus, a user makes an input to the smart phone and controls the external apparatus through the smart phone.

For example, when various functions of the external apparatus has are displayed on a screen of the smart phone in the form of a graphic user interface (GUI), a user makes a touch input or the like for selecting one of the functions displayed as the GUI while looking at the screen of the smart phone. Then, the smart phone recognizes a user's touch input received through the touch screen, or other similar input, and controls the external apparatus to implement a function for controlling the external apparatus corresponding to the GUI selected by the recognized touch input.

However, in this configuration, a user needs to look at the screen of the electronic apparatus to make an input in the middle of watching the screen of the external apparatus, and it is thus inconvenient for the user since his/her eyes are moved from the external apparatus to the electronic apparatus. To solve such a problem, if a free motion type of user input is made instead of the touch input using the GUI, the electronic apparatus additionally needs a motion recognition sensor to recognize a user motion and therefore causes another problem of increasing costs.

SUMMARY

An aspect of an embodiment, there is provided an electronic apparatus and a control method thereof, in which a user motion for controlling an external apparatus is recognized without using a separate motion recognition sensor, thereby performing a control function for the external apparatus.

According to an aspect of an embodiment, there is provided an electronic apparatus including: a communication interface configured to communicate with an external apparatus; a sensor; and a processor configured to perform an operation of the electronic apparatus to identify a direction of a user motion relative to the sensor based on a value sensed by the sensor, and control the communication interface to transmit to the external apparatus a control command for controlling the external apparatus based on the direction of the user motion.

Here, the plurality of sensors may be arranged in a predetermined direction, and the processor may identify a direction of the user motion based on changes between a first value sensed by a first sensor among the plurality of sensors, changes between a second value sensed by a second sensor among the plurality of sensors, and a difference between a first position of the first sensor on the electronic apparatus and a second position the second sensor on the electronic apparatus.

Here, the plurality of sensors may include a proximity sensor and an optical sensor.

Here, the processor may identify a direction of the user motion based on a first pattern of the first value sensed by the first sensor and a second pattern of the second value sensed by the second sensor.

Here, the electronic apparatus may further include a display, wherein the processor controls the optical sensor to sense color of external light emitted from the external apparatus, and controls the display to display an image with at least one color corresponding to the sensed color.

Here, the processor may control the display to make at least one color of the displayed image be different from color of the light sensed by the optical sensor.

Here, the image with at least one color may include an image with a plurality of different colors, and the processor may control the image to be displayed with the plurality of colors arranged in the direction of the first position of the first sensor to the second position of the second sensor.

Here, the processor may control the display to display the image with the at least one color based on a control signal received from the external apparatus.

According to an aspect of an embodiment, there is provided, a method of controlling an electronic apparatus, the method including: identifying a direction of a user motion relative to a sensor in the electronic apparatus based on a value sensed by the sensor, and transmitting to an external apparatus a control command to control the external apparatus based on the direction of the user motion.

Here, the plurality of sensors may include a plurality of sensors arranged in a predetermined direction, and the identifying of the direction of the user motion may include identifying a direction of the user motion based on changes between a first value sensed by a first sensor among the plurality of sensors, changes between a second value sensed by a second sensor among the plurality of sensors, and a difference between a first position of the first sensor on the electronic apparatus and a second position the second sensor on the electronic apparatus.

Here, the plurality of sensors may include a proximity sensor and an optical sensor.

Here, the identifying of the direction of the user motion may include identifying a direction of the user motion based on a first pattern of the first value sensed by the first sensor and a second pattern of the second value sensed by the second sensor.

Here, the identifying of the direction of the user motion may include sensing color of external light emitted from the external apparatus by the optical sensor, and displaying an image with at least one color corresponding to the sensed color.

Here, the displaying of the image may include displaying the image by making at least one color of the displayed image be different from color of the light sensed by the optical sensor.

Here, the image with at least one color may include an image with a plurality of different colors, and the displaying of the image may include displaying the image with the plurality of colors arranged in the direction of the first position of the first sensor to the second position of the second sensor.

Here, the displaying of the image may include displaying the image with the at least one color based on a control signal received from the external apparatus.

According to an aspect of an embodiment, there is provided a non-transitory computer-readable recording medium having embodied thereon a computer program, which when executed causes an electronic apparatus to perform a method of controlling the electronic apparatus, the method including: identifying a direction of a user motion relative to a sensor in the electronic apparatus based on a value sensed by the sensor, and transmitting to an external apparatus a control command to control the external apparatus based on the direction of the user motion.

BRIEF DESCRIPTION OF THE DRAWINGS

The above and/or the aspects will become apparent and more readily appreciated from the following description of embodiments, taken in conjunction with the accompanying drawings, in which:

FIGS. 6 and 7 illustrate the electronic apparatus in FIG. 1 recognizing a user motion in accordance with a change in a sensor value;

FIG. 8 illustrates positions of sensors provided in the electronic apparatus in FIG. 1;

FIG. 9 illustrates the electronic apparatus in FIG. 1 guiding an orientation direction;

FIGS. 10 and 11 illustrate the electronic apparatus in FIG. 1 recognizing a user motion in accordance with patterns of a sensor value;

FIG. 13 illustrates an embodiment of a control image; and

FIG. 14 illustrates the electronic apparatus in FIG. 1 recognizing a user motion in accordance with a change in a sensed measurement.

DETAILED DESCRIPTION OF EMBODIMENTS

Figure 1:
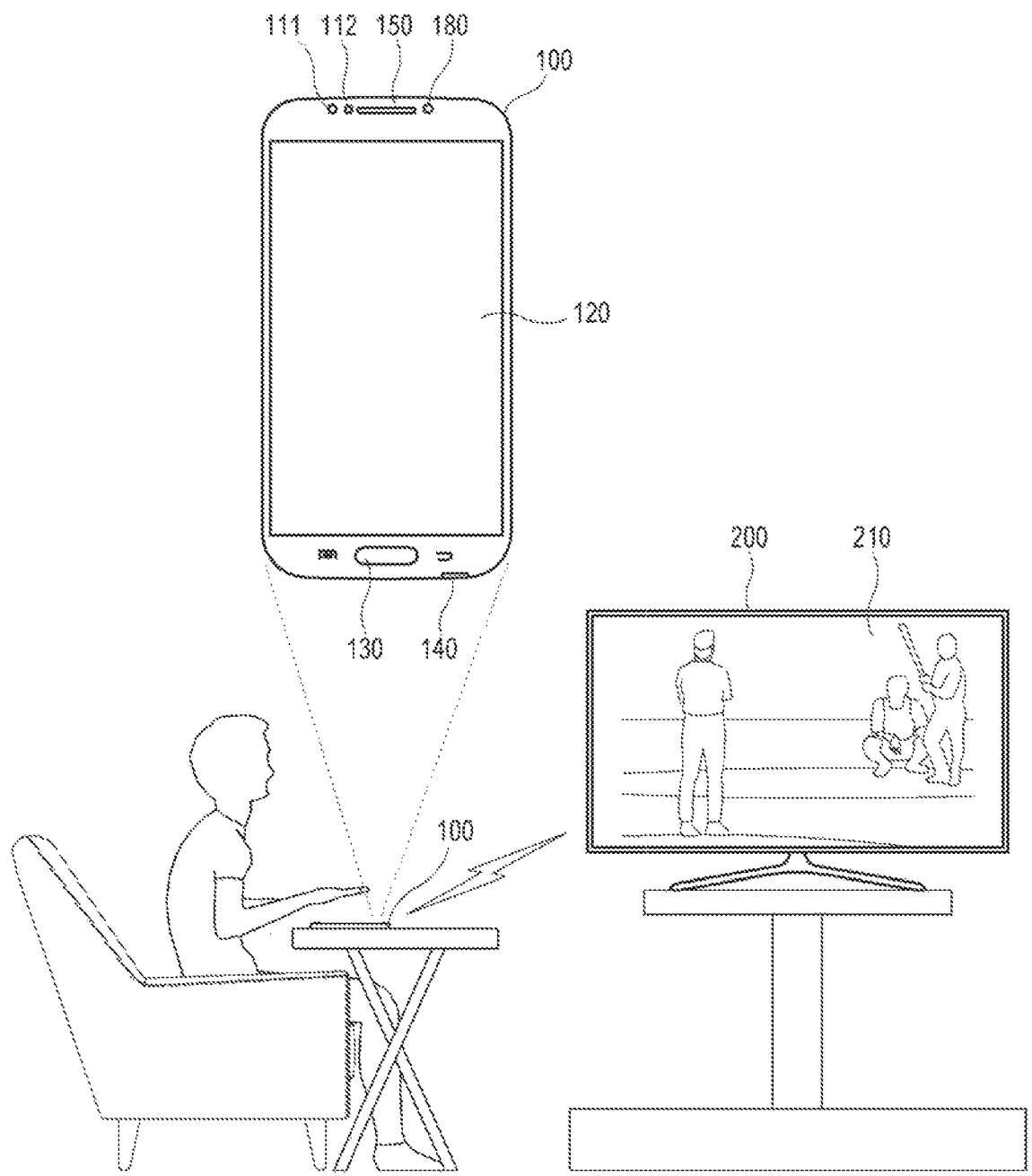
FIG. 1 illustrates a diagram of an electronic apparatus controlling an external apparatus, according to an embodiment.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same function. In the disclosure, at least one among a plurality of elements refers to not only all the plurality of elements but also both each one of the plurality of elements excluding the other elements and a combination thereof. Expressions such as "at least one of," when preceding a list of elements, modify the entire list of elements and do not modify the individual elements of the list. For example, the expressions "at least one of a, b, and c," "at least one of a, b, or c," and "at least one of a, b, and/or c" and similar expressions should be understood as including the combinations of only a, only b, only c, both a and b, both a and c, both b and c, or all of a, b, and c.

FIG. 1 illustrates a diagram of an electronic apparatus controlling an external apparatus. In FIG. 1, a user controls an external apparatus 200 through an electronic apparatus 100 while looking at an image 210 displayed on the external apparatus 200. The external apparatus 200 may be a television (TV) or other like display apparatus, but may be actualized without limitation in the disclosure. For example, the external apparatus 200 may be actualized by various apparatus such as a computer monitor, a multimedia player, an electronic frame, a digital billboard, a large format display (LFD), a digital signage, a set-top box, a refrigerator, etc.

The electronic apparatus 100 refers to an apparatus separate from the external apparatus 200, and may for example be actualized by a smart phone, a smart pad, a wearable smart device, a mobile phone, a tablet personal computer (PC), an electronic book terminal, a personal digital assistant (PDA), a portable multimedia player (PMP), etc. without limitation.

The electronic apparatus 100 may perform various functions in accordance with its actual form. For example, the electronic apparatus 100 may perform controlling the external apparatus 200 and also various functions such reproducing audio and/or visual content, making a voice call, making a video call, capturing a moving picture, capturing a still picture, sending a message, browsing the Internet, etc.

To perform the foregoing functions, the electronic apparatus 100 may leverage a sensor value obtained by a sensor. For example, the electronic apparatus 100 may perform the function of capturing a still picture by executing a photographing application. The electronic apparatus 100 may control a focus or exposure of a camera on the basis of a proximity sensor value from a proximity sensor and an optical sensor value from an optical sensor. Here, a mode in which the electronic apparatus 100 employs the proximity sensor, the optical sensor and the like sensor and performs the function of capturing a still picture, etc. will be called a first mode. In the first mode according to an embodiment, various functions such as playing back content, making a voice call, making a video call, capturing a moving picture, capturing a still picture, sending a message, browsing Internet, etc. may be performed.

The electronic apparatus 100 according to an embodiment may control the functions of the external apparatus 200 in response to a user input. A mode in which the electronic apparatus 100 controls the functions of the external apparatus 200 except the foregoing functions of the first mode will be called a second mode. In the second mode, the electronic apparatus 100 may recognize a user input for controlling the functions of the external apparatus 200 through the plurality of sensors.

In the second mode, the user input includes a user motion. That is, the electronic apparatus 100 may employ a plurality of sensors, which are used in carrying out its own functions in the first mode, to recognize the user motion for controlling the external apparatus 200 in the second mode. As an example of the plurality of sensors according to an embodiment, the proximity sensor and the optical sensor are used for the functions of the electronic apparatus 100 to set a photographing condition in the first mode, but used to recognize a user motion for controlling the external apparatus 200 in the second mode.

In more detail, the user motion is for example activity of a hand among body parts, and a motion of moving a user's hand from left to right is a control command for increasing the volume of the external apparatus 200.

When a user makes a motion of moving a hand from left to right with respect to the electronic apparatus 100 in the second mode, the electronic apparatus 100 recognizes that the motion is made from left to right on the basis of the sensor values of the proximity sensor and the optical sensor. The electronic apparatus 100 transmits information about the recognized motion to the external apparatus 200, and the external apparatus 200 determines the control command based on the received information about the motion, and performs an operation of turning the volume up in response to the control command. Alternatively, the electronic apparatus 100 may transmit the control command for increasing the volume of the external apparatus 200 to the external apparatus 200 on the basis of the information about the recognized motion, and the external apparatus 200 may perform the operation of increasing the volume in response to the received control command.

The motion in this embodiment is not limited to a hand motion, and the electronic apparatus 100 may sense a motion based on another body part such as a user's face, arm, body, leg, etc. Further, the electronic apparatus 100 may be designed to recognize directions of various motions, and different control commands may be respectively assigned to the directions of the motions. For example, the electronic apparatus 100 may recognize left/right directions, up/down directions, a diagonal direction, a perpendicularly approaching/receding direction, etc. with respect to the electronic apparatus 100. Corresponding to the directions of the motions of the electronic apparatus 100, various control commands for power on/off, channel up/down, volume up/down, content selection, content downloading, content play, content stop, content deletion, etc. in the external apparatus 200.

Thus, the electronic apparatus 100 according to an embodiment is more convenient for a user because the user can input a control command based on a motion without looking at the screen of the electronic apparatus 100 for a touch input and thus control the external apparatus 200 while watching the external apparatus 200. Further, the plurality of sensors used to carry out the functions of the electronic apparatus 100 are employed in recognizing the user motion for controlling the external apparatus 200, and thus costs are reduced because there are no needs of separate motion recognition sensor for recognizing the user motion.

Figure 2:
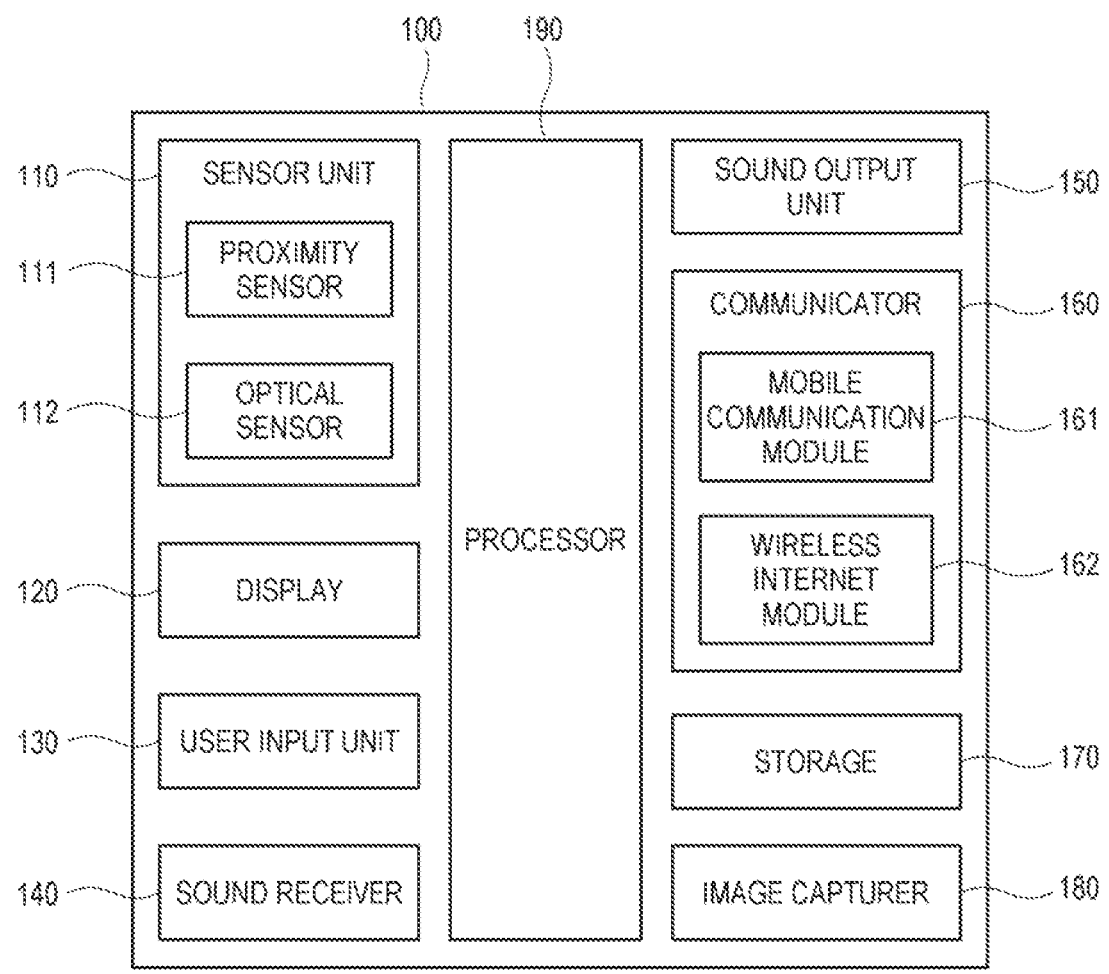
FIG. 2 illustrates a block diagram of the electronic apparatus in FIG. 1.

FIG. 2 illustrates a block diagram of the electronic apparatus in FIG. 1. The electronic apparatus 100 in FIG. 1 may include a sensor unit 110, a display 120, a user input unit 130, a sound receiver 140, a sound output unit 150, a communicator 160, a storage 170, an image capturer 180, and a processor 190. However, the electronic apparatus 100 may be designed to exclude some of the elements shown in FIG. 2 or include other elements not shown in FIG. 2.

The sensor unit 110 may include a plurality of sensors for obtaining various sensor values. For example, the sensor unit 110 may include an image capturer 180, a proximity sensor 111, an optical sensor 112, a sound sensor, a temperature sensor, a humidity sensor, a pressure sensor, an impact sensor, a depth sensor, a global positioning system (GPS) sensor, a gyro sensor, etc.

The image capturer 180 obtains a capture image of a front direction thereof. The image capturer 180 may be actualized by a camera of a complementary metal oxide semiconductor (CMOS) or a charge coupled device (CCD). There may be two or more image sensors 180.

The proximity sensor 111 is configured to sense a distance from a surrounding object. For example, when the proximity sensor 111 employs a time-of-flight method for measuring an infrared signal, the electronic apparatus 100 measures a distance from a moving object by measuring a delay time until an output infrared signal is reflected and returns from the object. When the proximity sensor 111 employs a magnetic measurement method of an object, a distance from the moving object is measured based on a magnetic field, magnetic intensity, a magnetic field direction, change in magnetic force, etc. However, there are no limits to the kind of the proximity sensor 111, and the proximity sensor 111 may be actualized by a magnetic saturation type, a high-frequency oscillation type, a differential coil, electrostatic capacitance type, etc.

The optical sensor 112 measures the intensity and amount of light incident thereon. The optical sensor 112 may for example be actualized by lead sulfide (PbS) or cadmium sulfide (CdS) photoconductive cells. According to an embodiment, the image capturer 180 may serve as the optical sensor 112.

The display 120 displays an image based on an image signal. The display 120 may be actualized by a liquid crystal display, a thin film transistor-liquid crystal display, an organic light-emitting diode, a flexible display, a 3-dimensional (3D) display, etc. The display 120 may be also actualized by a touch screen together with the user input unit 130 for receiving a touch input.

The user input unit 130 receives a user input for controlling the operations of the electronic apparatus 100. The user input unit 130 may include a touch screen, a key pad, a dome switch, a touch pad (static pressure/electrostatic), a jog wheel, a jog switch, a finger mouse, etc.

The sound receiver 140 receives and processes a sound signal into an electric audio signal. The sound receiver 140 may use various noise removal algorithms to remove noise generated while receiving a sound signal. The sound receiver 140 may be actualized by a microphone, and the microphone may be used as the sound sensor. The sound output unit 150 may emit a processed audio signal that is audible to a user. The sound output unit 150 may be actualized by a loudspeaker.

The communicator 160 may be a communication interface having an antenna to perform wireless communication with the external apparatus 200 through various communication standards. For example, the communicator 160 may perform wireless communication based on Wi-Fi, Bluetooth, ZigBee, Wi-Fi Direct (WFD), ultra-wideband (UWB), infrared Data Association (IrDA), Bluetooth low energy (BLE), near field communication (NFC), etc.

The communicator 160 may further include a mobile communication mobile 161 for transmitting and receiving a wireless signal to and from at least one of a base station, an external terminal and a server on a mobile communication network, a wireless Internet module 162 for wireless connection with the Internet or other network, a near field communication module for near field communication, a GPS module, etc.

The storage 170 may be configured to store data, a program, or an application for various functions to be implemented by the electronic apparatus 100. The storage 170 may include a storage medium of at least one type among a flash memory type, a hard disk type, a multimedia card micro type, a card type memory (e.g. a secure digital (SD) or extreme digital (XD) memory, etc.), a random access memory (RAM), and a read only memory (ROM). The storage 170 may be actualized by a web storage that operates on the Internet.

The processor 190 may generally control the elements of the electronic apparatus 100. The processor 190 executes the functions of the electronic apparatus 100 based on the sensor value sensed by the sensor unit 110 in the first mode. Further, the processor 190 may execute a control function to recognize a user motion, and output a control command indicating the direction of the recognized motion to the external apparatus 200, based on the sensor value sensed by the sensor unit 110 when the electronic apparatus operates in, for example, the second mode.

The processor 190 executes a control program (or an instruction) for generally controlling the elements as described above. The electronic apparatus 100 may include a nonvolatile memory in which the control program is installed, and a volatile memory into which at least a part of the installed control program is loaded. Further, such a control program may be also stored in another electronic apparatus besides the electronic apparatus 100.

The control program may include a program(s) actualized in the form of at least one among a basis input/output system (BIOS), a device driver, an operating system, a firmware, a platform, and an application. According to an embodiment, the application may be installed or stored by a manufacturer of the electronic apparatus 100, or may be installed based on application data received or downloaded from an application source by a user. The application data may for example be downloaded from an application market and the like external server. Such an external server is an example of a computer program product, but not limited to this example.

The electronic apparatus 100 may further include a signal processor and a power supply. The signal processor applies various processes to a received video or audio signal so that the display 120 or the sound output unit 150 can output an image or a sound. The signal processor may include a hardware processor actualized by a chipset, a circuit, a buffer, etc. mounted on to a printed circuit board, and may also be designed as a system on chip (SoC). Further, the power supply may receive external power or internal power and supply power necessary for the elements of the electronic apparatus 100 under control of the processor 190.

Figure 3:
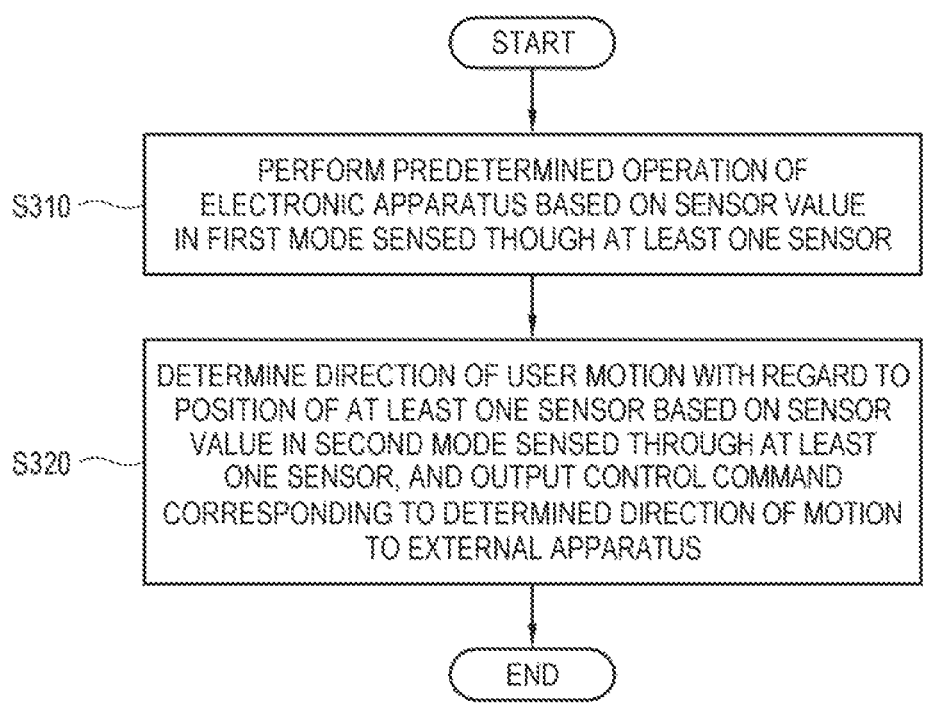
FIG. 3 illustrates a flowchart of a method of controlling the electronic apparatus in FIG. 1.

FIG. 3 illustrates a flowchart of a method of controlling the electronic apparatus in FIG. 1. The control method of the electronic apparatus shown in FIG. 3 may be performed as the processor 190 of the electronic apparatus 100 shown in FIG. 2 executes at least one control program. In the following description, unless otherwise mentioned, the operation of the processor 190 is an operation performed by executing the control program.

First, the processor 190 may perform an operation of the electronic apparatus 100 based on the sensor value sensed though the sensor unit 110 including the plurality of sensors in the first mode (S310). Further, the processor 190 may identify a direction of a user motion based on a sensor value sensed through the sensor unit 110, and output a control command corresponding to the direction of the determined motion to the external apparatus 200, in the second mode (S320).

In the operations S310 and S320, the processor 190 may identify whether a current mode is the first mode or the second mode in accordance with whether a preset event occurs. For example, the processor 190 identifies that the current mode is the first mode when the preset event has not occurred. When the present event occurs in the first mode, the processor 190 identifies that the current mode is the second mode. That is, the electronic apparatus 100 may switch over to the second mode and operate in the second mode in response to the occurrence of the preset event while operating in the first mode.

Figure 4:
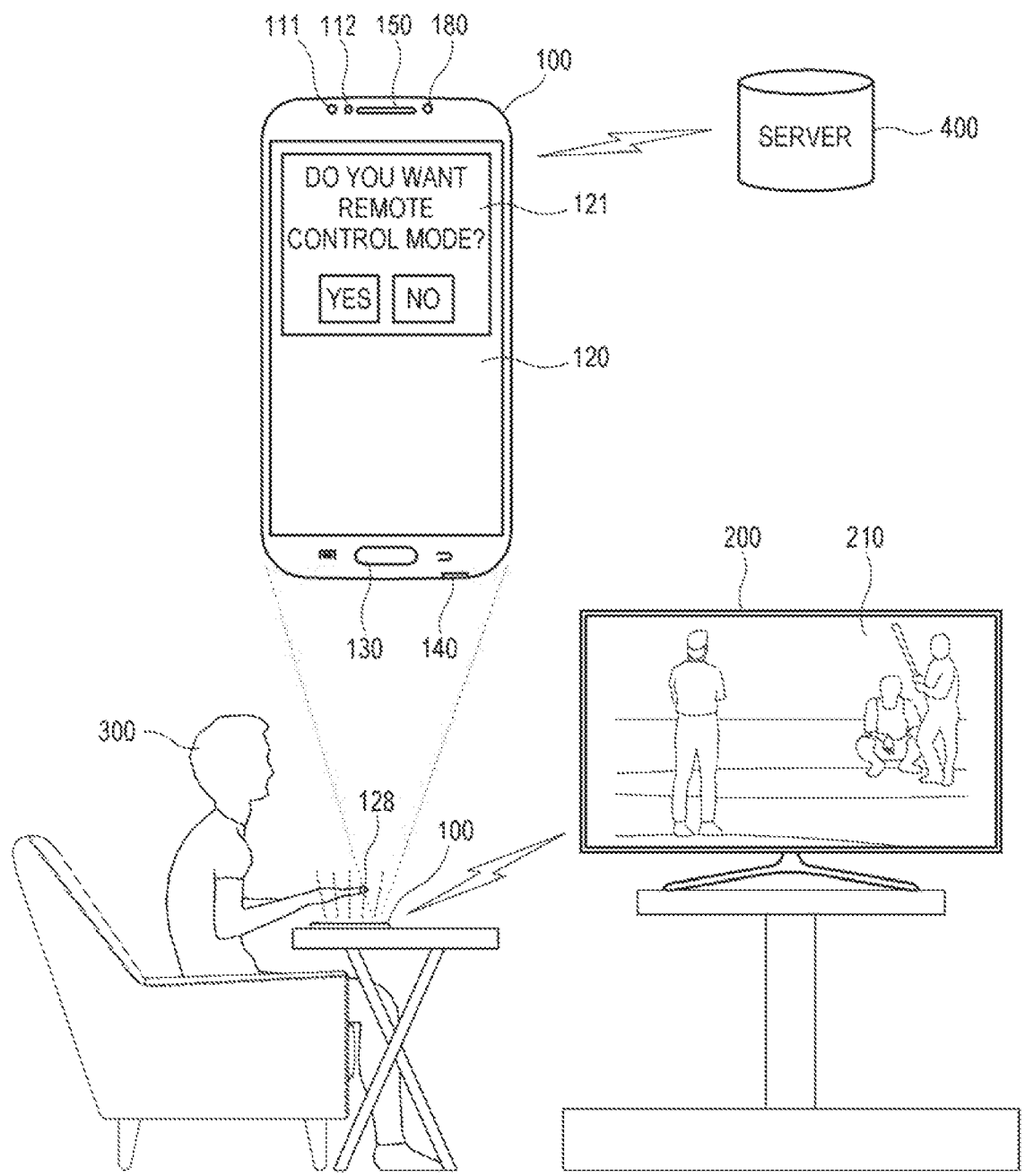
FIG. 4 illustrates a diagram of mode switching of the electronic apparatus in FIG. 1.

FIG. 4 illustrates a diagram of mode switching of the electronic apparatus in FIG. 1. In FIG. 4, it will be assumed that the external apparatus 200 is displaying the image 210, and a user 300 wants to control the display of the image 210 in the external apparatus 200. Further, it will be also assumed that the electronic apparatus 100 carries out an operation in the first mode.

The operation in the first mode may for example include not only an operation for providing a function to be positively usable by the user 300, such as playing back content, making a call, capturing an image, sending a message, browsing the Internet, etc., but also an operation for providing a function not to be positively usable by the user 300, such as a standby mode of a smart phone, etc.

The processor 190 determines whether the preset event occurs while operating in the first mode. The present event in this embodiment may for example include that the user 300 of the external apparatus 200 moves close to the electronic apparatus 100 within a predetermined distance from the electronic apparatus 100.

For example, when the user 300 moves toward the external apparatus 200 while taking the electronic apparatus 100 so as to watch the image 210 of the external apparatus 200, the processor 190 identifies that the external apparatus 200 approaches the electronic apparatus 100 within a predetermined distance from the electronic apparatus 100 on the basis of information obtained through the communicator 160 or the like.

Alternatively, the preset event may include that the electronic apparatus 100 is connected for communication with the external apparatus 200. A communication method between the electronic apparatus 100 and the external apparatus 200 may for example be Wi-Fi, Bluetooth, etc. For example, when the user 300 moves close to the external apparatus 200 while taking the electronic apparatus 100, the processor 190 controls the communicator 160 to connect with the external apparatus 200 by a preset communication method such as Bluetooth, etc., and identifies that the preset event occurs based on the completion of such connection.

Alternatively, the preset event may include that the user input unit 130 receives from the user 300 a command of entering the second mode. For example, the processor 190 may identify whether a received touch input, voice command, etc. corresponds to a command to enter the second mode in response to the touch input, the voice command, etc. received on the touch screen during the operation in the first mode. In this case, the processor 190 displays a UI including a menu item, which is to receive a command of the user 300 to enter the second mode, on the display 120, and identifies the preset event based on the touch input received through the menu item of the UI.

Alternatively, the preset event may include that a request for entering the second mode is received from the external apparatus 200 or an external server 400. For example, while the electronic apparatus 100 performs the operation of the first mode as connected for communication with the external apparatus 200 or the external server 400, the processor 190 may identify whether a signal received from the external apparatus 200 or the external server 400 corresponds to a request for entering the second mode, based on the signal received from the external apparatus 200 or the external server 400 through the communicator 160. The external apparatus 200 or the external server 400 may recognize a user's intention through the sensor or the like or receive a user's input, thereby transmitting a request signal for entering the second mode to the electronic apparatus 100.

Alternatively, the preset event may include that the external apparatus 200 displays a preset image 210. The preset image 210 displayed by the external apparatus 200 may be, for example, an image 210 of preset content or content from a preset category. For example, the processor 190 may identify that the external apparatus 200 displays the preset image 210 based on information included in a signal received from the external apparatus 200 through the communicator 160. In this case, the external apparatus 200 may transmit a signal, which includes information about currently displayed content, to the electronic apparatus 100.

Alternatively, the processor 190 may identify whether the external apparatus 200 displays the preset image 210 based on the information obtained by the sensor unit 110 such as the image capturer 180, etc.

The preset event according to an embodiment is not limited to the foregoing examples, and may include various events besides the foregoing examples.

According to one embodiment, the processor 190 may identify that the preset event occurs based on an apparatus use history of a user. The apparatus use history of a user may for example be a use time, a use place, etc. of the electronic apparatus 100 or the external apparatus 200. The preset event based on the apparatus use history may for example include that a user watches a TV in a certain place at a certain time. Further, the preset event according to an embodiment may be based on a user's daily life, such as a wake-up time, a bed time, etc. of a user.

According to an embodiment, the apparatus use history of the user or the information about a user's daily life may be stored in the electronic apparatus 100 or may be stored in the external apparatus 200 or the external server 400. When the information is stored in the external apparatus 200 or the external server 400, the processor 190 may receive information from the external apparatus 200 or the external server 400 or may receive a request for entering the second mode from the external apparatus 200 or external server 400 storing the information.

When it is determined that the present event occurs during the operation of the first mode, the processor 190 may switch from the first mode to the second mode. Specifically, the processor 190 may execute an application dedicated to control of the external apparatus in response to the occurrence of the preset event. The dedicated application according to an embodiment may be one of at least one control program as described above.

According to an embodiment, the processor 190 may display a UI 121, which guides a control mode of the external apparatus 200 to a user, on the display 120 when the preset event occurs. The UI 121 may include items for allowing a user to select whether to execute the control mode of the external apparatus 200. When a user's touch input to execute the control mode is received through the UI 121, the processor 190 may execute the dedicated application and exit the second mode.

Figure 5:
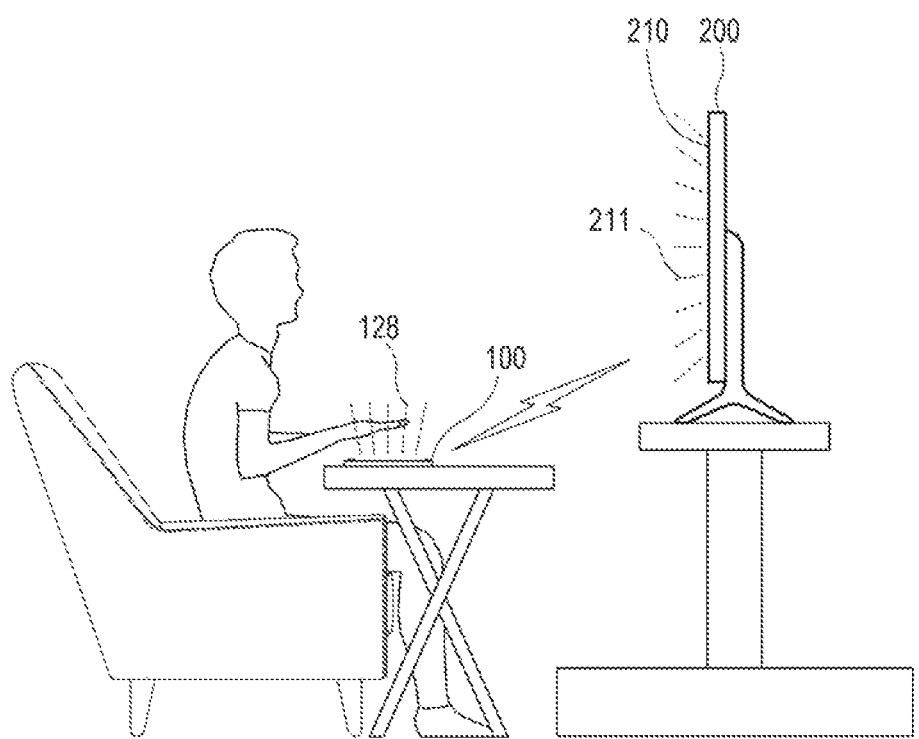
FIG. 5 illustrates the electronic apparatus in FIG. 1 displaying a control image.

FIG. 5 illustrates the electronic apparatus in FIG. displaying a control image. Referring to FIG. 5, the processor 190 according to this exemplary embodiment may control the display 120 to display an image (hereinafter, referred to as a "control image") for controlling the external apparatus 200 in response to entering the second mode.

According to an embodiment, the brightness or color of a control image 128 may be previously determined or may vary depending on surrounding environments. According to an embodiment, the control image 128 serves to apprise a user to intuitively know the position of the electronic apparatus 100 without moving his/her eyes toward the electronic apparatus 100, when the user makes a motion while watching the screen 210 of the external apparatus 200 to control the external apparatus 200. Therefore, the control image 128 according to an embodiment is configured to have the brightness or corresponding color so that a user can easily estimate the position of the electronic apparatus 100 while watching the screen 210 of the external apparatus 200.

For example, the processor 190 may control the brightness of the control image 128 to be higher than intensity of surrounding illumination. The processor 190 may identify the surrounding illumination based on information obtained by the image capturer 180, the optical sensor 112, etc. Thus, a user can easily estimate the position of the electronic apparatus 100 based on brightness of the control image 128 being brighter than the surrounding illumination.

As an additional or alternative example, the processor 190 may control the color of the control image 128 to be distinguishable from the color of ambient light. The processor 190 may identify the color of the ambient light based on information obtained by the image capturer 180, the optical sensor 112, etc. For example, the processor 190 may set a color complementary to the color of the ambient light as the color of the control image 128. Therefore, a user can more easily estimate the position of the electronic apparatus 100 based on the control image 128 showing a contrast to the color of the ambient light.

As an optional example, the processor 190 may identify the surrounding illumination or the color of the ambient light based on the brightness or color 211 of the image 210 displayed on the external apparatus 200. For example, the processor 190 may receive information about the image 210 displayed on the external apparatus 200 from the external apparatus 200 through the communicator 160, and identify the surrounding illumination or the color of the ambient light based on the received information. As an optional example, the processor 190 may change the brightness or color of the control image 128 in accordance with change in the surrounding illumination or the color of the ambient light. As an optional example, the processor 190 may set the brightness or color of the control image 128 based on settings set up by a user. In this case, the processor 190 may control the display 120 to display a UI including menu items for setting the brightness or color of the control image 128, and set the brightness or color of the control image 128 based on a user input received through the UI.

The processor 190 according to an embodiment recognizes a user motion for controlling the external apparatus 200 based on a sensor value obtained by the sensor unit 110 in the second mode, and performs control to transmit information about the recognized user motion to the external apparatus 200. Below, an example that the electronic apparatus 100 according to an embodiment recognizes the user motion based on the sensor value obtained by the sensor unit 110 will be described in detail.

FIGS. 6 and 7 illustrate the electronic apparatus in FIG. 1 recognizing a user motion in accordance with a change in a sensor value. The electronic apparatus 100 includes a case 101 that is structure forming an outer appearance. The case 101 is provided as the front and rear of the electronic apparatus 100, forming a space to accommodate and secure the elements of the electronic apparatus 100.

On the case 101, there may be provided the proximity sensor 111, the optical sensor 112, the display 120, the user input unit 130, the sound receiver 140, the sound output unit 150, and the image capturer 180. Alternatively, the electronic apparatus 100 may be designed to exclude at least one of the above elements or include other elements provided on the case 101.

Referring to FIG. 8, proximity sensor 111 and the optical sensor 112 of the electronic apparatus 100 may be arranged apart from each other by a predetermined distance on the case 101. The proximity sensor 111 of the electronic apparatus 100 may be arranged at the left of the optical sensor 112 and spaced apart by a predetermined distance D1 from the optical sensor 112 in a widthwise direction. However, there are no limits to the arrangement or direction. Alternatively, the two sensors 111 and 112 may be arranged in a lengthwise or diagonal direction of the electronic apparatus 100, and the optical sensor 112 may be also arranged at the left of the proximity sensor 111 as spaced apart by a predetermined distance D2 from the proximity sensor 111.

According to an embodiment, it will be assumed that the proximity sensor 111 outputs a sensor value that decreases as the object approaches the proximity sensor 111 and thus a distance between the proximity sensor 111 and an object becomes smaller, and the optical sensor 112 outputs a sensor value that increases as the object blocks out light incident to the optical sensor 112 and thus the intensity of the light decreases. However, such sensing features of the proximity sensor 111 and the optical sensor 112 are merely an example, and may be conversely designed to obtain other sensor values.

FIG. 6 shows a user's general operation of moving a hand 310 from the left toward the right of the electronic apparatus 100. In, (a) of FIG. 6, the hand 310 of the user is initially positioned at the left of the electronic apparatus 100. As shown in (b) of FIG. 6, the hand 310 is then positioned at the right of the electronic apparatus 100, as the user's hand 310 moves from the left to the right. Further, the graph in (c) of FIG. 6 shows relative changes of the proximity sensor value and the optical sensor value as the hand 310 moves from the left toward the right of the electronic apparatus 100.

Referring to the graph in (c) of FIG. 6, a proximity sensor value gradually decreases as the hand 310 moves from the left toward the right of the electronic apparatus 100, reaches a minimum value Ma at a first point in time a1, maintains the minimum value Ma, and increases at a second point in time a2. Here, the minimum value Ma refers to a proximity sensor value corresponding to the shortest distance between the hand 310 and the proximity sensor 111.

The optical sensor value gradually increases, reaches a maximum value Mb at a third point in time b1 when the hand 310 covers the optical sensor 112, maintains the maximum value Mb, and decreases at a fourth point in time b2. Here, the maximum value Mb refers to an optical sensor value corresponding to the lowest intensity of light blocked by the hand 310.

Due to difference D in position between the proximity sensor 111 and the optical sensor 112, the first point in time a1 at which the proximity sensor value reaches the minimum value Ma precedes the third point in time b1 at which the optical sensor value reaches the maximum value Mb. That is, when the first point in time a1 precedes the third point in time b1, the electronic apparatus 100 determines that a motion is made in a direction from the left toward the right of the electronic apparatus 100.

To more accurately determine the direction of the user motion, the electronic apparatus 100 may also determine whether the second point in time a2 at which the proximity sensor value increases from the minimum value Ma precedes the fourth point in time b2 at which the optical sensor value decreases from the maximum value Mb. That is, when the second point in time a2 precedes the fourth point in time b2, the electronic apparatus 100 determines that a motion is made in a direction from the left toward the right of the electronic apparatus 100.

FIG. 7 shows a user's general operation of moving the hand 310 from the right to the left of the electronic apparatus 100. In (a) of FIG. 7, the hand 310 of the user is initially positioned at the right of the electronic apparatus 100. In (b) of FIG. 7, the hand 310 is positioned at the left of the electronic apparatus 100 as the user's hand 310 moves from the right to the left. Further, the graph in (c) of FIG. 7 shows relative changes of the proximity sensor value and the optical sensor value as the hand 310 moves from the right to the left of the electronic apparatus 100.

Referring to the graph in (c) of FIG. 7, due to difference in position between the proximity sensor 111 and the optical sensor 112, the first point in time a1 at which the proximity sensor value reaches the minimum value Ma follows the third point in time b1 at which the optical sensor value reaches the maximum value Mb. That is, when the first point in time a1 lags behind the third point in time b1, the electronic apparatus 100 determines that a motion is made in a direction from the right to the left of the electronic apparatus 100.

To more accurately determine the direction of the user motion, the electronic apparatus 100 may also determine whether the second point in time a2 at which the proximity sensor value increases from the minimum value Ma follows the fourth point in time b2 at which the optical sensor value decreases from the maximum value Mb. That is, when the second point in time a2 lags behind the fourth point in time b2, the electronic apparatus 100 determines that a motion is made in a direction from the right to the left of the electronic apparatus 100.

As described above, the electronic apparatus 100 determines the direction of the user motion based on the change in the proximity sensor value and the optical sensor value. Thus, the electronic apparatus 100 is convenient for a user because the electronic apparatus 100 determines the direction of the user motion and the user does not focus a gaze, which remains focused on the external apparatus 200 to be remotely controlled, on the electronic apparatus 200.

FIG. 8 illustrates positions of sensors provided in the electronic apparatus in FIG. 1. In FIGS. 6 and 7, the proximity sensor 111 and the optical sensor 112 are arranged leaving a predetermined distance D (e.g., D, D1, D2) in the widthwise direction, but there are no limits to the distance D and the arrangement direction. Alternatively, various distances D and arrangement directions are possible.

For example, the proximity sensor 111 and the optical sensor 112 are arranged in the widthwise direction of the electronic apparatus 100 as shown in (a) of FIG. 8, but the proximity sensor 111 and the optical sensor 112 may be respectively arranged at the left and the right of the sound output unit 150. According to an alternative embodiment, the proximity sensor 111 may be arranged at the right and the optical sensor 112 may be arranged at the left.

With this arrangement, a predetermined distance D1 between the proximity sensor 111 and the optical sensor 112 is larger than those of FIGS. 6 and 7. As the distance D1 between the proximity sensor 111 and the optical sensor 112 increases, the determinations of whether the first point in time a1 precedes or follows the third point in time b1 and whether the second point in time a2 precedes or follows the fourth point in time b2 become more accurate.

Further, as shown in (b) of FIG. 8, the proximity sensor 111 and the optical sensor 112 may be arranged in the lengthwise direction of the electronic apparatus 100, and the proximity sensor 111 and the optical sensor 112 may be respectively the left and the right of the display 120. As an alternative embodiment, it may be designed to arrange the proximity sensor 111 at the right and arrange the optical sensor 112 at the left.

With this arrangement, a predetermined distance D2 between the proximity sensor 111 and the optical sensor 112 is larger than that in (a) of FIG. 8, and therefore determining whether the first point in time a1 precedes or follows the third point in time b1 and whether the second point in time a2 precedes or follows the fourth point in time b2 may be more accurately determined.

FIG. 9 illustrates the electronic apparatus in FIG. guiding an orientation direction. When the electronic apparatus 100 is switched over to the second mode, a preferred orientation direction of the electronic apparatus 100 is guided in accordance with the arrangement of the proximity sensor 111 and the optical sensor 112. The guiding method may include a method of displaying a UI through the display 120 or a method of outputting a sound through the sound output unit 150.

According to an embodiment, as shown in (a) of FIG. 9, when the proximity sensor 111 and the optical sensor 112 are arranged along the widthwise direction of the electronic apparatus 100, a UI 123 in which the upper and lower sides of the electronic apparatus 100 are oriented toward the external apparatus 200 may be displayed on the display 120. The UI 123 may guide a user to correctly orient the electronic apparatus 100. As necessary, a UI 311 indicating a motion direction recognizable by the electronic apparatus 100 may be further displayed to guide a user to correctly make the motion.

Further, as shown in (b) of FIG. 9, the proximity sensor 111 and the optical sensor 112 are arranged along the lengthwise direction of the electronic apparatus 100, a UI 123 in which the left and right sides of the electronic apparatus 100 are oriented toward the external apparatus 200 may be displayed on the display 120. As necessary, a UI 311 indicating the motion direction recognizable by the electronic apparatus 100 may be further displayed.

Figure 11:
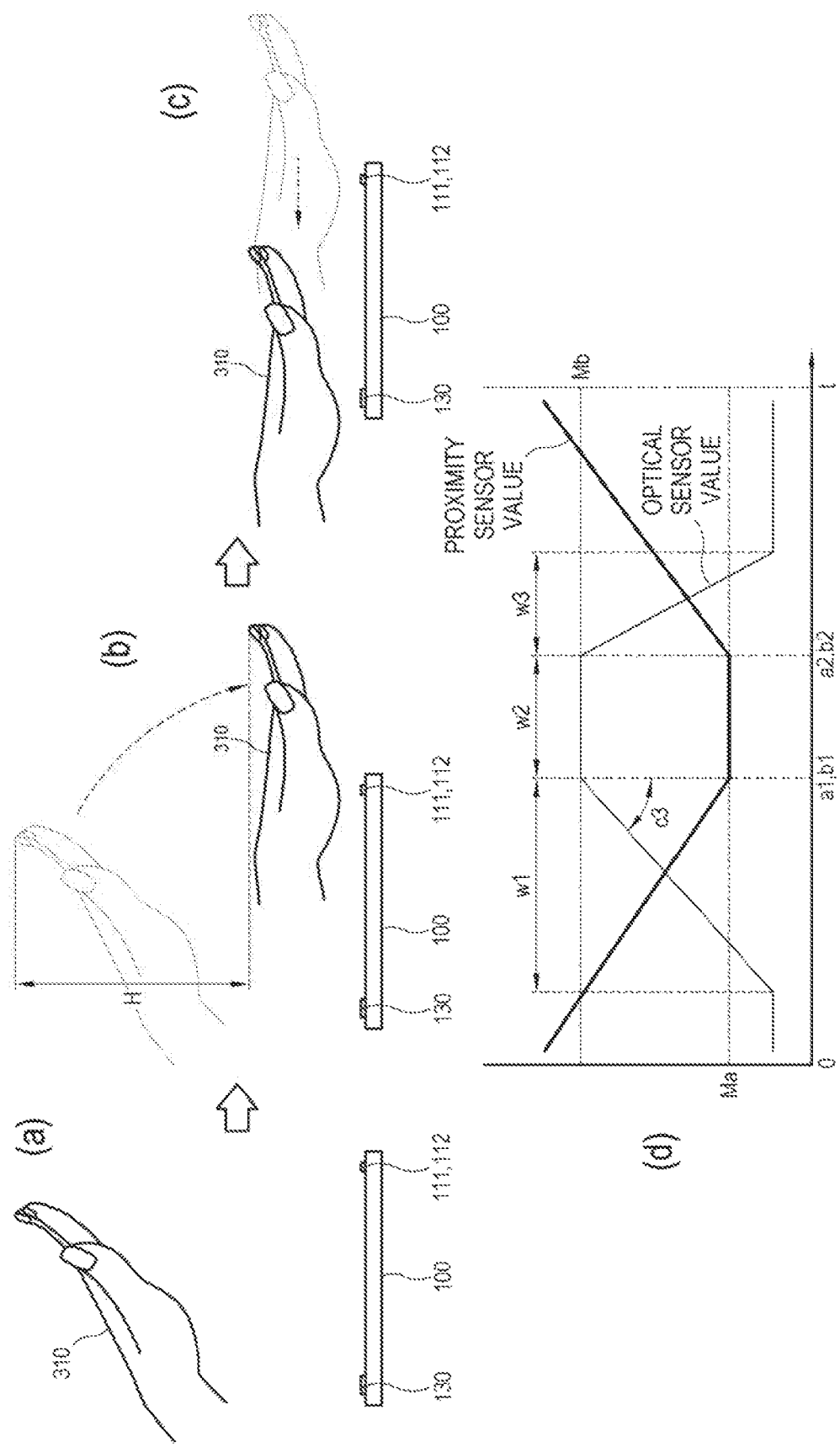

FIGS. 10 and 11 illustrate the electronic apparatus in FIG. 1 recognizing a user motion in accordance with patterns of a sensor value. In the electronic apparatus 100 of FIGS. 10 and 11, the proximity sensor 111 and the optical sensor 112 of are arranged along the widthwise direction of the electronic apparatus 100, but such arrangement not limited thereto.

FIG. 10 shows a user's general operation of moving the hand 310 from the bottom of the front surface of the electronic apparatus 100 toward the top of the front surface of the electronic apparatus 100. In (a) of FIG. 10, the hand 310 of the user is positioned at the bottom of the front surface of the electronic apparatus 100. In (b) of FIG. 10, the hand 310 is positioned at the top of the front surface of the electronic apparatus 100 as the hand moves from the bottom to the top of the front surface. Further, the graph in (c) of FIG. 10 shows relative changes of the proximity sensor value and the optical sensor value as the hand 310 moves from the bottom of the front surface toward the top of the front surface of the electronic apparatus 100.

Referring to the graph in (c) of FIG. 10, a proximity sensor value gradually decreases as the hand 310 moves from the bottom toward the top of the electronic apparatus 100, and maintains the minimum value Ma from the first point in time a1. The optical sensor value gradually increases, and maintains the maximum value Mb from the third point in time b12 when the hand 310 covers the optical sensor 112.

Because the proximity sensor 111 and the optical sensor 112 are arranged along the widthwise direction of the electronic apparatus 100, the first point in time a1 may be equal to the third point in time b12. In other words, the electronic apparatus 100 may determine that the motion direction is oriented from the bottom of the front surface across or toward the top of the front surface of the electronic apparatus 100 when the first point in time a1 is equal to the third point in time b12.

However, the profile of the hand 310 may be too irregular that the first point in time a1 and the third point in time b12 are unequal. For example, even when the hand 310 moves from the bottom of the front surface toward the top of the front surface of the electronic apparatus 100, the third point in time b11 preceding the first point in time a1 or the third point in time b13 following the first point in time a1 may be detected.

In this case, the motion direction may be determined based on the patterns of the sensor values. Referring back to the graph of FIG. 6, in which the hand 310 moves from the left toward the right, to describe the case of identifying the motion direction based on the pattern of the optical sensor value, the optical sensor value in the graph in (c) of FIG. 6 includes a first section w1 in which the optical sensor value increases before the third point in time b1 at which the maximum value Mb starts, a second section w2 in which the maximum value Mb is maintained, and a third section w3 in which the optical sensor value decreases after the fourth point in time b2 at which the maximum value Mb ends.

On the other hand, referring to the graph in (c) of FIG. 10 in which the hand 310 moves from the bottom toward the top, the optical sensor value includes the first section w1 in which the optical sensor value increases before the third point in time b12 at which the maximum value Mb starts, and a second section w2 in which the maximum value Mb is maintained. In other words, when the hand 310 moves from the bottom toward the top of the front surface, the optical sensor value does not include the third section w3 in which the optical sensor value decreases after the fourth point in time b2 at which the maximum value Mb ends.

That is, the electronic apparatus 100 may determine that the hand 310 moves from the bottom toward the top of the front surface based on the pattern of the optical sensor value including the first section w1 and the second section w2, even though whether the first point in time a1 precedes or follows the third point in time b12 may be undetermined. On the other hand, the electronic apparatus 100 may determine that the hand 310 moves from the left toward the right based on the pattern of the optical sensor value that includes the third section w3 as well as the first section w1 and the second section w2.

In similar manner, the electronic apparatus 100 can determine the motion direction based on the pattern of the proximity sensor value. That is, the electronic apparatus 100 determines that the hand 310 moves from the bottom toward the top of the front surface when the pattern of the proximity sensor value does not include the section, in which the proximity sensor value increases from the minimum value Ma after the second point in time a2, as shown in the graph (c) of FIG. 6.

FIG. 11 shows a user's general operation of moving the hand 310 from the top toward the bottom of the front surface of the electronic apparatus 100. In (a) of FIG. 11, the hand 310 of the user is positioned over the bottom of the front surface of the electronic apparatus 100. In (b) of FIG. 11, the hand 310 is positioned at the top of the front surface as moved from the bottom of the front surface. In (c) of FIG. 11, the hand 310 is inversely moved from the top of the front surface toward the bottom of the front surface. In (a) and (b) of FIG. 11, vertical movement of the hand 310 having a height difference H greater than or equal to a predetermined threshold while the hand 310 moves from the bottom toward the top is illustrated. Whereas (a) and (b) of FIG. 10 illustrate horizontal movement of the hand 310 having a height difference H less than or equal to the predetermined threshold.

Meanwhile, in (c) of FIG. 11, the hand 310 is positioned at the bottom of the front surface as moved from the top of the front surface. Further, the graph in (d) of FIG. 11 shows relative changes of the proximity sensor value and the optical sensor value as the hand 310 moves from the bottom of the front surface toward the top of the front surface of the electronic apparatus 100.

Referring to the graph in (d) of FIG. 11, the proximity sensor value gradually decreases as the hand 310 moves from the bottom of the front surface toward the top of the front surface of the electronic apparatus 100, reaches the minimum value Ma at the first point in time a1, maintains the minimum value Ma, and starts increasing at the second point in time a2. The optical sensor value gradually increases, reaches the maximum value Mb at the third point in time b1 when the hand 310 covers the optical sensor 112, maintains the maximum value Mb, and starts decreasing at the fourth point in time b2.

Because the proximity sensor 111 and the optical sensor 112 are arranged in the widthwise direction of the electronic apparatus 100, the first point in time a1 may be equal to the third point in time b1, or the second point in time a2 may be equal to the fourth point in time b2. In this case, the electronic apparatus 100 may determine that the motion direction is oriented from the bottom toward the top of the electronic apparatus 100.

However, the profile of the hand 310 may be irregular such that the third point in time b1 and the fourth point in time b2 may be respectively changed with regard to the first point in time a1 and the second point in time a2. In this case, the electronic apparatus 100 may determine the motion direction based on the patterns of the sensor values.

Referring back to the graphs in (d) of FIGS. 6 and 10, in which the hand 310 moves from the left toward the right, to describe the case of identifying the motion direction based on the pattern of the optical sensor value, the optical sensor value in the graph of FIG. 6 increases by a first change rate c1 in the first section w1, and the optical sensor value in the graph of FIG. 10 increases by a second change rate c2 in the first section w1.

However, the hand 310 in FIGS. 6 and 10 shows the horizontal movement of which the height difference H is less than or equal to the predetermined threshold, but the hand 310 in FIG. 11 involves vertical movement of which the height difference H is greater than or equal to the predetermined threshold. Therefore, the optical sensor value in the graph of FIG. 11 increases by a third change rate c3 lower than the first change rate c1 or the second change rate c2.

That is, the electronic apparatus 100 may determine that the hand 310 moves from the top toward the bottom based on the pattern of the optical sensor value showing a gentle gradient in the first section w1. Likewise, the electronic apparatus 100 may determine that the hand 310 moves from the top to the bottom based on the proximity sensor value different in the pattern from the proximity sensor value of FIGS. 6 and 10.

Figure 12:
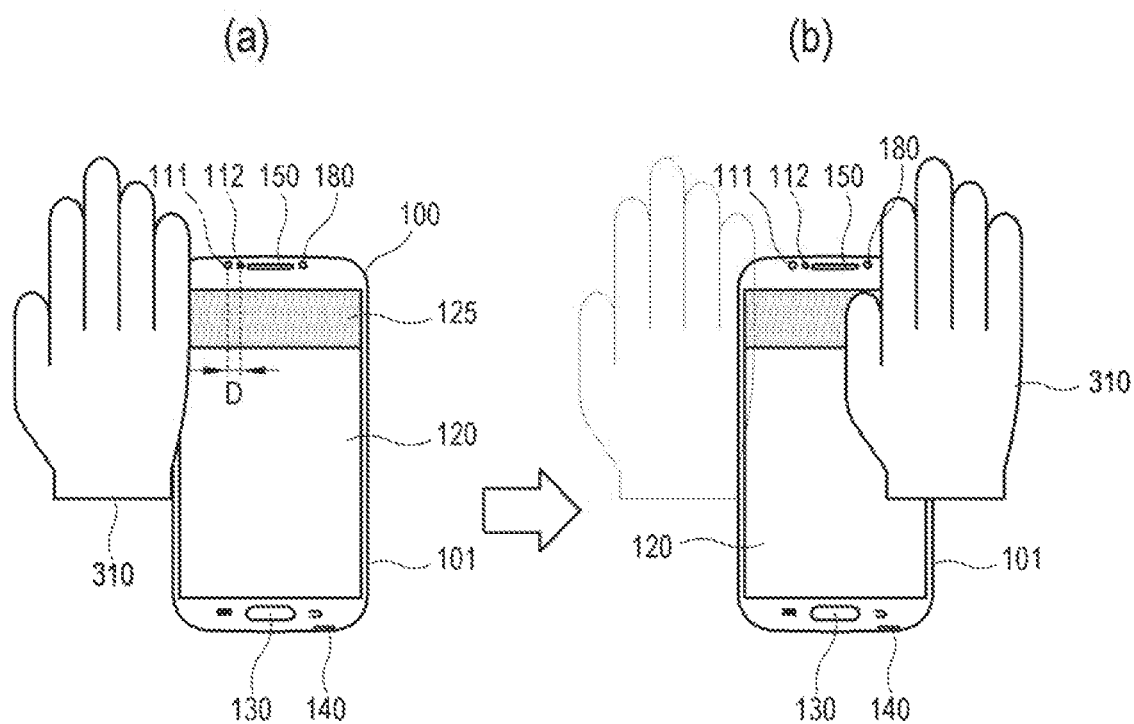
FIG. 12 illustrates the electronic apparatus in FIG. recognizing a user motion based on a change in a sensor value of a control image.

FIG. 12 illustrates the electronic apparatus in FIG. recognizing a user motion based on a change in a sensor value of a control image. As described above with reference to FIG. 5, the electronic apparatus 100 may display the control image 128 with a predetermined brightness or color on the display 120 when entering the second mode in response to various events.

For example, the processor 190 may display a control image 125 with a predetermined color on the display 120, and sense a change or a change pattern in a sensor value of a light reflected as the hand 310 moves from left (a) in FIG. 12 to right (b) in FIG. 12. The control image 125 may be displayed on any area of the display 120, but it is preferable that the control image 125 is displayed on an area near to the optical sensor 112.

A process, in which the electronic apparatus 100 determines the moving direction of the hand 310 based on the change or changing pattern in the proximity sensor value and the optical sensor value of the reflected light is similar to those described with reference to FIGS. 6, 7, 10, and 11, and thus redundant descriptions are omitted. Like this, when the control image 125 having a predetermined color is displayed on the display 120, it is easy to remotely control the external apparatus 200 without being affected by surrounding environments.

FIG. 13 illustrates an embodiment of the control image. The electronic apparatus 100 FIG. 12 displays the control image 125 having one color on a certain area of the display 120, but the electronic apparatus 100 of FIG. 13 displays at least two images 126 and 127 different in color on a certain area of the display 120.

FIG. 13 illustrates that a first control image 126 having a first color is displayed at the left of a second control image 127 having a second color along the widthwise direction of the electronic apparatus 100. However, there are no limits to the display position or arranging order between the first control image 126 and the second control image 127. For example, the first control image 126 and the second control image 127 may be displayed on an area adjacent to the optical sensor 112 along the arrangement direction of the proximity sensor 111 and the optical sensor 112.

The optical sensor 112 may sense a first color value based on the first control image 126 and a second color value based on the second control image 127. The optical sensor 112 may be provided as a single sensor capable of sensing two or more colors, or may be provided as two or more optical sensors for sensing different colors.

The graph in (c) of FIG. 13 shows relative changes in a first color value and a second color value as the hand 310 moves from the left toward the right of the electronic apparatus 100, for example, from (a) in FIG. 13 to (b) in FIG. 13. Referring to the graph in (c) of FIG. 13, the first color value gradually increases as the hand 310 moves from the left toward the right of the electronic apparatus 100, reaches the maximum value Ma at the first point in time a1, maintains the maximum value Ma, and starts decreasing at the second point in time a2. Here, the maximum value Ma may refer to the first color value corresponding to the maximum intensity of the first color reflected from the hand 310. The second color value also gradually increases, reaches the maximum value Mb at the third point in time b1, maintains the maximum value Mb and starts decreasing at the fourth point in time b2. Here, the maximum value Mb may refer to the second color value corresponding to the maximum intensity of the second color reflected from the hand 310.

Due to difference in position between the first control image 126 and the second control image 127, the first point in time a1 precedes the third point in time b1. That is, when the first point in time a1 precedes the third point in time b1, the electronic apparatus 100 may determine that the motion direction is oriented from the left toward the right of the electronic apparatus 100. To more correctly determine the motion direction, the electronic apparatus 100 may also determine whether the second point in time a2 precedes the fourth point in time b2.

Meanwhile, a process, in which the electronic apparatus 100 determines the moving direction of the hand 310 based on the change or changing pattern in the first color value and the second color value, is similar to those described with reference to FIGS. 6, 7, 10 and 11, and therefore redundant descriptions are omitted.

FIG. 14 illustrates the electronic apparatus in FIG. 1 recognizing a user motion in accordance with a change in a sensed measurement. The electronic apparatus 100 of FIG. 14 employs a sound sensor 140 instead of the proximity sensor 111 used by the electronic apparatus 100 of FIGS. 6, 7, 10, and 11. The sound sensor 140 senses whether a sound output through the sound output unit 150 is changed in strength due to movement of the hand 310.

Referring to the graph in (c) of FIG. 14, a sound sensor value gradually decreases as the hand 310 moves from the left toward the right of the electronic apparatus 100, for example from (a) in FIG. 14 to (b) in FIG. 14, reaches the minimum value Ma at the first point in time a1, maintains the minimum value Ma, and starts increasing at the second point in time a2. Here, the minimum value Ma refers to a sound sensor value corresponding to the maximum sound strength between the hand 310 and sound sensor 140. The optical sensor value gradually increases, reaches the maximum value Mb at the third point in time b1 when the hand 310 covers the optical sensor 112, maintains the maximum value Mb, and starts decreasing at the fourth point in time b2.

Due to difference in position between the sound sensor 140 and the optical sensor 112, the first point in time a1 at which the sound sensor value reaches the minimum value Ma precedes the third point in time b1 at which the optical sensor value reaches the maximum value Mb, and the second point in time a2 at which the sound sensor value starts increasing from the minimum value Ma precedes the fourth point in time b2 at which the optical sensor value starts decreasing from the maximum value Mb. In this case, the electronic apparatus 100 may determine that the motion direction is oriented from the left toward the right of the electronic apparatus 100. A process, in which the electronic apparatus 100 determines the moving direction of the hand 310 based on the change or changing pattern in the sound sensor value and the optical sensor value, is similar to those described with reference to FIGS. 5, 6, 9, and 10, and thus redundant descriptions thereof are omitted.

The methods according to the foregoing embodiments may be achieved in the form of a program of computer-readable instructions that can be executed in various computers, and recorded in a computer readable medium. Such a computer readable medium may include a program, a data file, a data structure or the like, or combination thereof. For example, the computer readable medium may be stored in a volatile or nonvolatile storage such as a ROM or the like, regardless of whether the medium is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program recorded in this storage medium may be specially designed and configured according to the embodiments, or may be publicly known and available to those skilled in the art of computer software.

Accordingly, the electronic apparatus according to the disclosure recognizes the direction of the user motion for controlling the external apparatus without using a separate motion recognition sensor and performs a function of controlling the external apparatus, and it is more convenient for a user because the user can control the external apparatus while looking at the external apparatus.

Although the disclosure and merits have been described with reference to the embodiments and drawings, the disclosure and scope of the right are not limited thereto. It will be appreciated by those skilled in the art that various changes may be made in these embodiments without departing from the principles and spirit of the disclosure, the scope of which is defined in the appended claims and their equivalents. It will be understood that the detailed descriptions and drawings in the disclosure are merely an example for description, and various alternative embodiments are also included in the extent of the disclosure.

What is claimed is:

1. An electronic apparatus comprising:
communication circuitry configured to communicate with an external apparatus;
a plurality of sensors comprising a first sensor and a second sensor, the first sensor being arranged apart from the second sensor by a predetermined distance; and
a processor configured to:
obtain a first sensing value through the first sensor and a second sensing value through the second sensor,
identify an occurrence order between a first change time of the first sensing value and a second change time of the second sensing value based on the predetermined distance,
identify a direction of a user motion relative to the plurality of sensors based on the occurrence order, and
control the communication circuitry to transmit to the external apparatus a control command for controlling a function being executed by the external apparatus based on the direction of the user motion.

2. The electronic apparatus according to claim 1, wherein the first sensor and the second sensor are arranged in a predetermined direction, and
wherein the processor is further configured to identify the user motion based on change in the first sensing value and the second sensing value.

3. The electronic apparatus according to claim 2, wherein the processor is further configured to identify the user motion based on a pattern of the first sensing value and the second sensing value.

4. The electronic apparatus according to claim 2, wherein of the first sensor comprises a proximity sensor and the second sensor comprises an optical sensor.

5. The electronic apparatus according to claim 4, wherein the processor is further configured to control the optical sensor to sense a color of external light emitted from the external apparatus, and control a display to display an image with at least one color determined based on a color of the external light emitted from the external apparatus.

6. The electronic apparatus according to claim 5, wherein the processor is further configured to control the display to display the image in a color different from the color of the external light emitted from the external apparatus.

7. The electronic apparatus according to claim 5, wherein the at least one color comprises a plurality of different colors, and
wherein the processor is further configured to control the display to display the image with the plurality of different colors arranged in the predetermined direction.

8. The electronic apparatus according to claim 5, wherein the processor is further configured to control the display to display the image with the at least one color based on a control signal received from the external apparatus.

9. A method of controlling an electronic apparatus, the method comprising:
obtaining a first sensing value of a first sensor among a plurality of sensors of the electronic apparatus;
obtaining a second sensing value of a second sensor among the plurality of sensors of the electronic apparatus;
identify an occurrence order between a first change time of the first sensing value and a second change time of the second sensing value based on the predetermined distance;
identifying a direction of a user motion relative to the plurality of sensors based on the occurrence order; and
transmitting to an external apparatus a control command for controlling a function being executed by the external apparatus based on the direction of the user motion.

10. The method according to claim 9, wherein the first sensor and the second sensor are arranged in a predetermined direction, and
wherein the identifying the user motion comprises identifying the user motion based on change in the first sensing value and the second sensing value.

11. The method according to claim 10, wherein the identifying the user motion comprises identifying the user motion based on a pattern of the first sensing value and the second sensing value.

12. The method according to claim 10, wherein the first sensor comprises a proximity sensor and the second sensor comprises an optical sensor.

13. The method according to claim 12, wherein the identifying the user motion comprises sensing a color of external light emitted from the external apparatus by the optical sensor, and displaying an image with at least one color determined based on a color of the external light emitted from the external apparatus.

14. The method according to claim 13, wherein the displaying of the image comprises displaying the image by displaying the image in a color different from the color of the external light emitted from the external apparatus.

15. The method according to claim 13, wherein the at least one color comprises a plurality of different colors, and
wherein the displaying of the image comprises displaying the image with the plurality of different colors arranged in the predetermined direction.

16. The method according to claim 13, wherein the displaying of the image comprises displaying the image with the at least one color based on a control signal received from the external apparatus.

17. A non-transitory computer-readable recording medium having stored thereon a computer program comprising a computer-readable codes, which when executed cause an electronic apparatus to perform a method of controlling the electronic apparatus, the method comprising:
obtaining a first sensing value of a first sensor among a plurality of sensors of the electronic apparatus;
obtaining a second sensing value of a second sensor among the plurality of sensors of the electronic apparatus;
identify an occurrence order between a first change time of the first sensing value and a second change time of the second sensing value based on the predetermined distance;
identifying a direction of a user motion relative to the plurality of sensors based on the occurrence order; and
transmitting to an external apparatus a control command for controlling a function being executed by the external apparatus based on the direction of the user motion.

* * * * *